J. J. CHESBRO.
LAWN MOWER SHARPENER.
APPLICATION FILED JULY 23, 1913.

1,092,021.

Patented Mar. 31, 1914.

Witnesses
Stuart Hilder.
Frances W. Anderson.

Inventor
John J. Chesbro
By E. W. Anderson & Son
his Attorneys

UNITED STATES PATENT OFFICE.

JOHN J. CHESBRO, OF ONEONTA, NEW YORK.

LAWN-MOWER SHARPENER.

1,092,021.  Specification of Letters Patent.  Patented Mar. 31, 1914.

Application filed July 23, 1913. Serial No. 780,832.

*To all whom it may concern:*

Be it known that I, JOHN J. CHESBRO, a citizen of the United States, resident of Oneonta, in the county of Otsego and State of New York, have made a certain new and useful Invention in Lawn-Mower Sharpeners; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
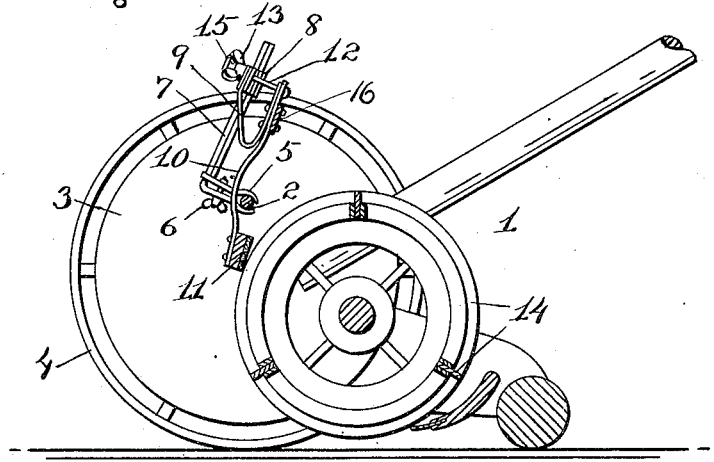
Figure 2:
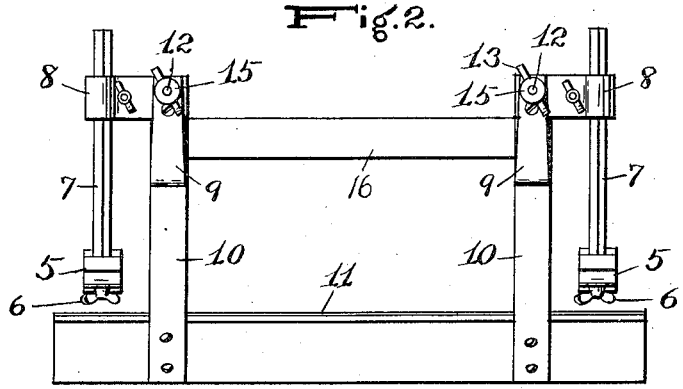
Figure 3:
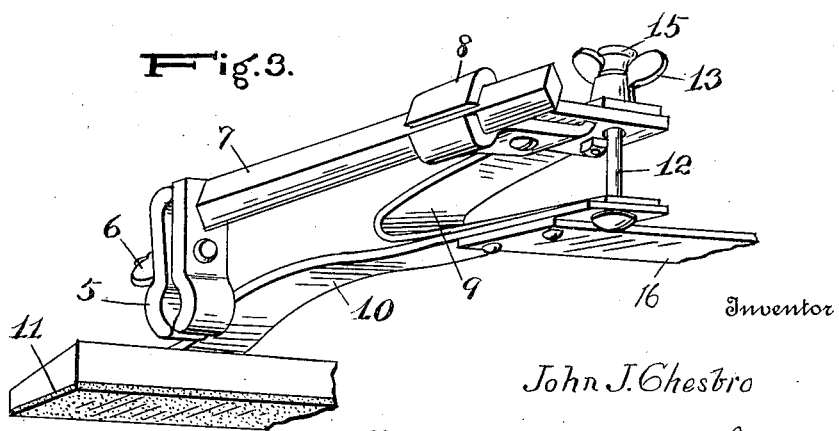

Figure 1 is a central vertical section of the invention as applied. Fig. 2 is a plan view of the invention. Fig. 3 is a perspective view of the invention partly broken away.

The invention has relation to lawn mower sharpeners, having for its object to provide an improved sharpener for an attachment to the ordinary mowers, and it consists in the novel construction and combinations of parts as hereinafter set forth.

In the accompanying drawings illustrating the invention, the numeral 1, designates a lawn mower, having the transverse brace rod 2, connecting stationary plates 3 at the inner sides of the wheels 4, only one of said plates being shown.

The sharpener attachment is provided with a pair of clamping jaws 5 at each end thereof designed for engagement with opposite end portions of said rod, thumb nuts 6, serving for adjustment of said jaws. Each of these jaws 5 carries as a rigid part thereof, an upwardly extending bar 7, usually of angular form in cross section, a second pair of clamping jaws 8 having slidable engagement with each of the bars 7, and extending in a direction at right angles to the jaws 7, inwardly of the mower in opposite directions.

One of the jaws 8 of each pair is longer than the other jaw, and has rigidly secured thereto an arm of a bow spring 9, extending downwardly and back in approximately parallel relation to the bar 7, the other arm of each bow spring having rigidly secured thereto an extension arm 10, also approximately parallel to the bars 7, and carrying at the lower or free end thereof the sharpener or emery stick or file 11.

Bolt connections 12 are provided for the arms of the bow springs, thumb nuts 13 upon said bolts serving for adjustment of the springs so that the arms thereof will approach or recede from each other to vary the adjustment of the extension arms 10 and of the emery stick with relation to the revolving knives 14 of the mower. Normally the thumb nuts will be loosened and the emery stick free of contact with the mower knives which operate as usual. The adjustment of the springs will be made secure by jam nuts 15 upon the bolts 12. The sharpener bar may be of any suitable material and have as a base either wood or metal. It is preferred to use a rod or bar 16 connecting the upper ends of the arms 10, and the bow springs.

The sharpener bar being located at the free ends of the extension arms of the springs, will have delicate yielding contact with the revolving mower knives; said knives turning comparatively freely and being in this way sharpened more evenly and with less effort.

What I claim is:—

1. A sharpener attachment for lawn mowers, comprising a clamp for engagement with a transverse brace rod of the mower, a bar rigidly secured to said clamp, a clamp having engagement with said bar, a spring carried by said last named clamp, an arm connected to said spring and extending beyond the same, and a sharpener bar carried by the free end of said arm, whereby the sharpener bar is adapted for delicate yielding contact with the mower knives.

2. A sharpener attachment for lawn mowers, comprising a clamp for engagement with a transverse brace rod of the mower, a bar rigidly secured to said clamp and extending substantially at right angles thereto, a clamp having engagement with said bar and extending at substantially right angles thereto and to the first named clamp, a bow spring carried by the last named clamp, an arm connected to and extending beyond said spring, and a sharpener bar carried by the free end of said arm.

3. A sharpener attachment for lawn mowers, comprising clamps for engagement with a transverse brace rod of the mower, bars rigidly secured to said clamps and extending substantially at right angles thereto, clamps having engagement with said bar and extending at substantially right angles thereto and to the first named clamps, bow springs carried by the last named clamps, arms connected to and extending beyond said springs, and a sharpener bar carried by the free end of said arms.

In testimony whereof I affix my signature, in presence of two witnesses.

JOHN J. CHESBRO.

Witnesses:
RALPH S. WYCKOFF,
CLAUDE V. SMITH.

Copies of this patent may be obtained for five cents each, by addressing the "Commissioner of Patents, Washington, D. C."